(12) United States Patent
Fu et al.

(10) Patent No.: US 12,392,606 B1
(45) Date of Patent: Aug. 19, 2025

(54) LASER-RANGING TELESCOPE WITH SWITCHABLE MAGNIFICATION

(71) Applicant: SHENZHEN RUIERXING ELECTRONIC CO., LTD., Shenzhen (CN)

(72) Inventors: Luxin Fu, Shenzhen (CN); Zhicheng Xing, Shenzhen (CN)

(73) Assignee: SHENZHEN RUIERXING ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 19/019,616

(22) Filed: Jan. 14, 2025

(30) Foreign Application Priority Data

Nov. 7, 2024 (CN) .......................... 202411582375.3

(51) Int. Cl.
*G01C 3/04* (2006.01)

(52) U.S. Cl.
CPC ...................................... *G01C 3/04* (2013.01)

(58) Field of Classification Search
CPC ........ G02B 23/02; G02B 23/04; G02B 23/10; G02B 23/18; G02B 27/0916; G02B 27/141; G02B 3/0062; G02B 7/003; G02F 1/1306
USPC ........................................ 356/3, 407
See application file for complete search history.

(56) References Cited

U.S. PATENT DOCUMENTS 5,706,129 A * 1/1998 Kato ..................... G02B 27/108
359/425

\* cited by examiner

*Primary Examiner* — Tri T Ton

(57) ABSTRACT

Disclosed is a laser-ranging telescope with switchable magnification, which includes a main body provided with a laser channel, a first optical path channel and a second optical path channel arranged in parallel along an axial direction. A through-hole is provided between the first and the second optical path channels, and a reflective switching plate is arranged within the first optical path channel. The reflective switching plate is deflectable between a first position and a second position to close the through-hole or allow the first and second optical path channels to be communicated, thereby switching the magnification of the telescope.

20 Claims, 8 Drawing Sheets

LASER-RANGING TELESCOPE WITH SWITCHABLE MAGNIFICATION

CROSS-REFERENCE TO RELATED APPLICATIONS

The present application claims priority of Chinese Patent Application No. 202411582375.3, filed on Nov. 7, 2024, the entire contents of which are hereby incorporated by reference.

TECHNICAL FIELD

The present disclosure relates to the field of optoelectronic technology, particularly to a laser-ranging telescope with switchable magnification.

BACKGROUND

A laser-ranging telescope generally has a natural light path channel, a laser emission path channel, and a laser reception path channel. For a two-tube-structured telescope, one of the laser emission and laser reception path channels coincides with the natural light path channel, and the other is independent. For a three-tube-structured telescope, the natural light path channel, laser emission path channel, and laser reception path channel are independent of each other.

Nowadays, the ranging capabilities of laser-ranging telescopes are continuously enhanced, which has put forward higher requirements for the magnification of the telescope system. However, currently, the telescope used for ranging is of a single magnification. If the magnification is simply increased, it will be impossible to take into account the disclosure of a wide field of view at close range. Therefore, it is necessary to make improvements in this regard.

SUMMARY

In view of this, the present disclosure provides a laser-ranging telescope with switchable magnification aimed at solving or at least improving the above-mentioned problems to some extent.

A laser-ranging telescope with switchable magnification, including: a main body provided with a laser channel, and a first optical path channel and a second optical path channel arranged in parallel along an axial direction, a through-hole being provided between the first optical path channel and the second optical path channel; a first objective lens set arranged at a first axial end of the first optical path channel; an eyepiece set arranged at a second axial end of the first optical path channel; a second objective lens set arranged at a first axial end of the second optical path channel with magnification different from the first objective lens set; a reflective switching plate arranged within the first optical path channel and deflectable between a first position and a second position; and a first reflector tilted within the second optical path channel and configured to reflect natural light entering the second optical path channel to the reflective switching plate; wherein when the reflective switching plate is positioned in the first position, the reflective switching plate closes the through-hole, and the natural light emitted by a target object passes through the first objective lens set and enters the first optical path channel to form an image at the eyepiece lens set; and wherein when the reflective switching plate is positioned in the second position, the first optical path channel communicates the second optical path channel, and the natural light emitted by the target object passes through the second objective lens set and enters the second optical path channel, is reflected to the reflective switching plate by the first reflector, and is then reflected by the reflective switching plate to be imaged at the eyepiece set.

In some embodiments, the image magnification of the second objective lens set is greater than that of the first objective lens set, and an axial length of the first optical path channel is greater than that of the second optical path channel.

In some embodiments, the reflective switching plate has a free end, and a rotating wheel fixed and exposed to the main body for deflecting the reflective switching plate, wherein the rotating wheel is arranged closer to the first objective lens set relative to the free end.

In some embodiments, the rotating wheel is located near the through-hole, when the reflective switching plate is deflected to the first position, the free end rests on a side wall of the first optical path channel proximal to the second optical path channel, and when the reflective switching plate is deflected to the second position, the free end rests on a side wall of the first optical path channel distal to the second optical path channel.

In some embodiments, when the reflective switching plate is deflected to the second position, an inclination of the reflective switching plate is the same as that of the first reflector.

In some embodiments, the laser channel comprises a laser emission channel and a laser reception channel, wherein the laser emission channel at least partially coincides with the first optical path channel, and the laser reception channel at least partially coincides with the second optical path channel.

In some embodiments, the laser channel comprises a laser emission channel and a laser reception channel, wherein the laser emission channel at least partially coincides with the second optical path channel, and the laser reception channel at least partially coincides with the first optical path channel.

In some embodiments, the laser channel comprises independently disposed laser emission and reception channels.

In some embodiments, the laser channel comprises a laser reception channel and an independently disposed laser emission channel, wherein the laser reception channel at least partially coincides with the first optical path channel or the second optical path channel.

In some embodiments, the laser channel comprises a laser emission channel and an independently disposed laser reception channel, wherein the laser emission channel at least partially coincides with the first optical path channel or the second optical path channel.

In some embodiments, a side wall of the first optical path channel distal to the second optical path channel is equipped with a laser emitter, which is located between the first objective lens set and the reflective switching plate for emitting the laser; and a second axial end of the second optical path channel is equipped with a laser receiver for receiving the laser.

In some embodiments, an emission end of the laser emitter is equipped with a first laser coupling mirror for converging the laser; and a reception end of the laser receiver is equipped with a second coupling mirror for converging the laser.

In some embodiments, the first optical path channel is equipped with a first dichroic mirror that transmits the natural light, the laser emitted by the laser emitter is reflected by the first dichroic mirror, passes through the first optical channel, and then reaches the target object; and the first reflector is a second dichroic mirror permeable to the laser, and the laser reflected by the target object enters the second optical channel, is transmitted by the second dichroic mirror, and then received by the laser receiver.

In some embodiments, wherein the reflective switching plate is deposed closer to the eyepiece set relative to the first dichroic mirror.

In some embodiments, wherein when the reflective switching is in the second position, it is tilted in a same direction as the first dichroic mirror.

In some embodiments, a second axial end of the second optical path channel is equipped with a laser emitter for emitting laser; and a laser receiver is provided on a side wall distal to the second optical path channel in the first optical path channel, and the laser receiver is located between the first objective lens set and the reflective switching plate for receiving laser.

In some embodiments, an emission end of the laser emitter is equipped with a first coupling mirror for converging the laser; and a reception end of the laser receiver is equipped with a second coupling mirror for converging the laser.

In some embodiments, the first optical path channel is equipped with a first dichroic mirror that transmits the natural light, the laser reflected by the target object enters the first optical channel and is received by the laser receiver after being reflected by the first dichroic mirror; and the first reflector is a second dichroic mirror that transmits the laser, the laser emitted by the laser emitter is transmitted by the second dichroic mirror, passes through the second optical channel, and reaches the target object.

In some embodiments, the first optical path channel is equipped with a laser emitter for emitting the laser; the second optical path channel is equipped with a laser receiver for receiving the laser; and the first reflector is a natural light reflector.

In some embodiments, the second optical path channel is provided with a second reflector, which is disposed between the second objective lens and the first reflector for reflecting the laser entering the second optical path channel to the laser receiver.

In some embodiments, the direction of laser emission from the laser emitter is perpendicular to the axis of the laser-ranging telescope.

The laser-ranging telescope with switchable magnification in the embodiments of the present invention includes a laser ranging channel for ranging and first and second optical path channels for observation. By arranging a deflectable reflective switching plate between the first and second optical path channels, the first and second optical path channels can be connected or closed, so that the target images with switched magnification can be obtained at the eyepiece set. In addition, operating the reflective switching plate does not affect the ranging function of the laser ranging channel.

Figure 1:
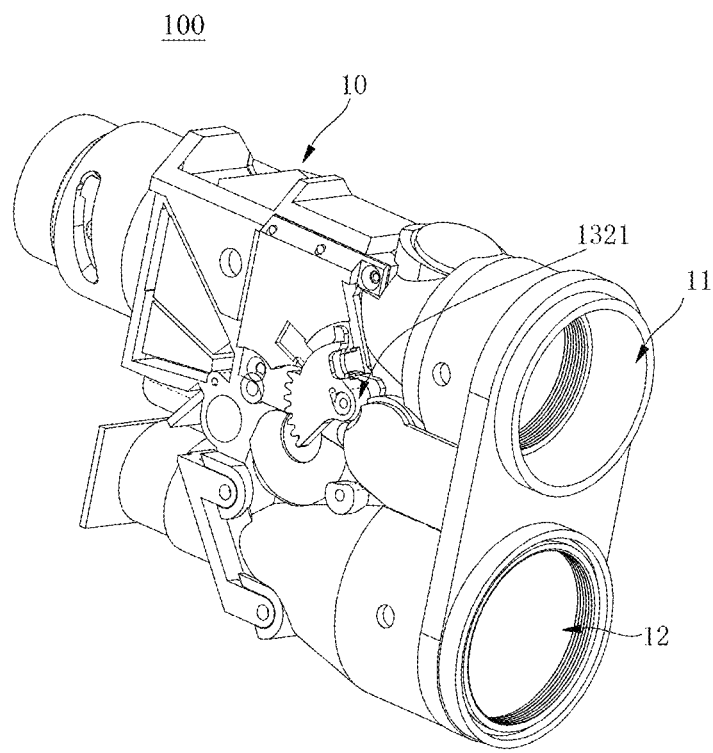
FIG. 1 is a perspective view of a laser-ranging telescope with switchable magnification according to a first embodiment of the present disclosure.
Figure 2:
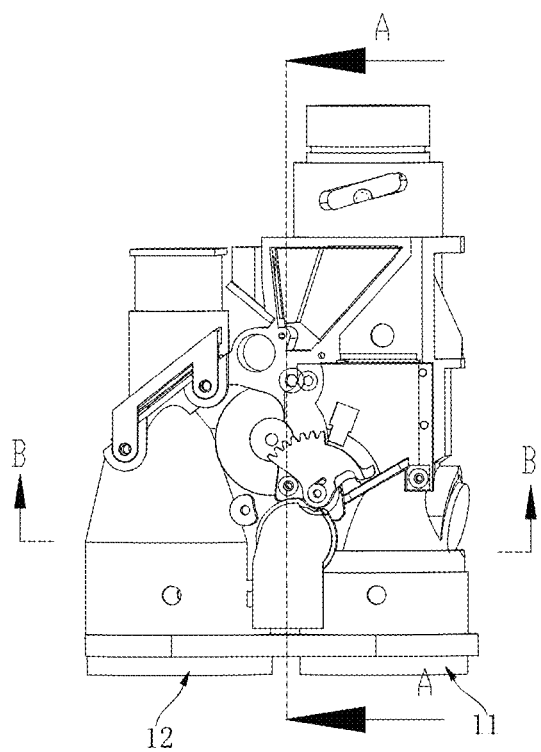
FIG. 2 is a front view of the laser-ranging telescope with switchable magnification shown in FIG. 1.

Reference signs: 100, laser-ranging telescope; 10. main body; 11. first optical path channel; 111. first objective lens set; 112. eyepiece set; 114. prism set; 115. first dichroic mirror; 12. second optical path channel; 121. second objective lens set; 122. first reflector; 13. through-hole; 132. reflective switching plate; 1321. rotating wheel; 14. laser channel; 15. laser emission channel; 151. laser emitter; 152. first laser reflector; 153. second laser reflector; 154. first coupling mirror; 16. laser reception channel; 161. laser receiver; 162. second laser coupling mirror; 363. third laser reflector; 364. fourth laser reflector; 365. second dichroic mirror.

DESCRIPTION OF EMBODIMENTS

The technical solutions in embodiments of the present disclosure will be clearly and completely described below with reference to accompanying drawings in the embodiments of the present disclosure. Apparently, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

It should be noted that all directional indications (such as up, down, left, right, front, back, etc.) in the embodiments of the present disclosure are only intended to explain a relative positional relationship, a motion situation, and the like between components in a particular pose (as shown in the drawings), and if the particular pose changes, the directional indication changes accordingly.

In addition, if terms "first", "second" or the like are involved in the embodiments of the present disclosure, the terms are for illustrative purposes only and are not to be construed as indicating or imposing a relative importance or implicitly indicating the number of technical features indicated. Thus, a feature that limited by "first", "second" may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present disclosure.

Figure 3:
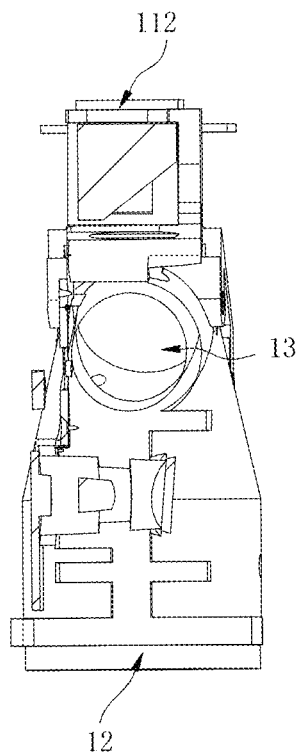
FIG. 3 is a cross-sectional view of the laser-ranging telescope with switchable magnification of FIG. 1 taken along the A-A line.

As shown in FIGS. 1 to 6 and 9, a laser-ranging telescope with switchable magnification 100 according to the first embodiment of the present disclosure includes a main body 10 and optical elements arranged inside the main body 10. The main body 10, i.e., the housing of the laser-ranging telescope 100, defines a laser channel 14 and a first optical path channel 11 and a second optical path channel 12 arranged in parallel along the axial direction. The axial direction is the extension direction of the laser-ranging telescope 100. The laser channel 14 is used to pass the laser, and the first light path channel 11 and the second light path channel 12 are used to pass natural light. As shown in FIG. 3, a through-hole 13 is provided between the first optical path channel 11 and the second optical path channel 12, allowing the first optical path channel 11 and the second optical path channel 12 to be communicated.

Figure 6:
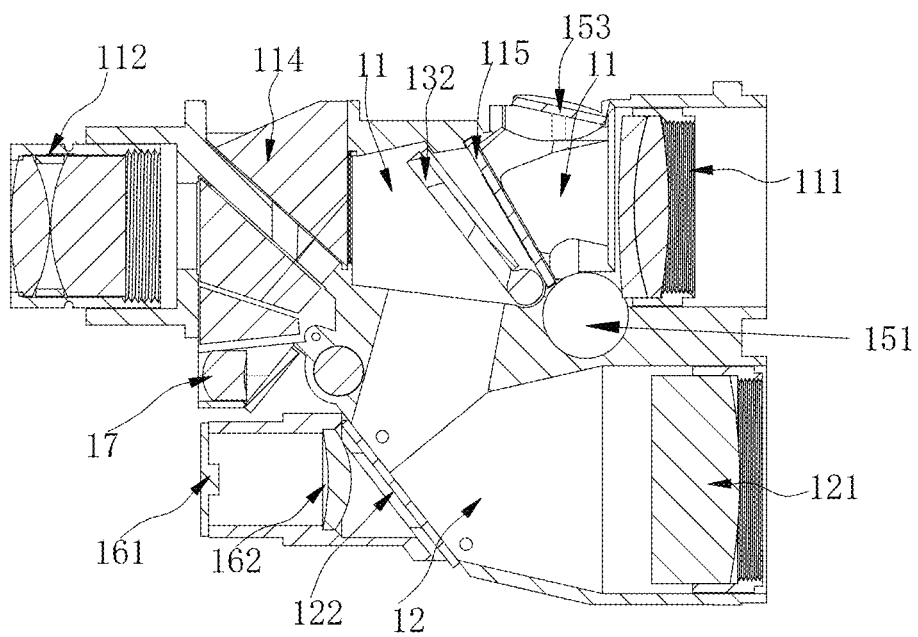
FIG. 6 is a cross-sectional view of the laser-ranging telescope with switchable magnification of FIG. 5 taken along line A-A, wherein the reflective switching plate is located at the second position.

As shown in FIG. 6, the first optical path channel 11 is equipped with a first objective lens set 111 at its first axial end proximal to the target object, which is used to magnify the target object at a first magnification. Similarly, the second optical path channel 12 is further equipped with a second objective lens set 121 at its first axial end proximal to the target object, for magnifying the target object at a second magnification. The second axial end of the first optical path channel 11 is equipped with an eyepiece set 112 for magnifying and imaging the target object. A prism set 114 is further provided within the first optical path channel 11 and located near the eyepiece set 112. After being transmitted by the first or second objective lens set, natural light is reflected by the prism set 114 to the eyepiece set 112 for imaging.

In this embodiment, the first objective lens set 111 has a magnification of 6× and the second objective lens set 121 has a magnification of 10×. The second objective lens set 121 is closer to the target object in the axial direction relative to the first objective lens set 111. The magnification of the first objective lens set 111 and the second objective lens set 121 may also be set in other embodiments according to actual needs.

The first optical path channel 11 is further provided with a reflective switching plate 132 deflectable between a first position and a second position to close the through-hole 13 or allow the first and second optical path channels 11,12 to communicate. Specially, the reflective switching plate 132 has a rotating wheel 1321 fixed and exposed to the main body 10 and a free end. The rotating wheel 1321 is located near the through-hole 13, and the free end of the reflective switching plate 132 is positioned closer to the eyepiece set 112 with respect to the rotation wheel 1321. When the reflective switching plate 132 is positioned in the first position, it rests on the inner wall of the first optical path channel 11 and closes the through-hole 13. When the reflective switching plate 132 is positioned in the second position, the free end rests on the inner wall of the side of the first optical path channel 11 distal to the second optical path channel 12, that is to say, the reflective switching plate 132 is inclined relative to the axis of the first optical path channel 11. In this way, the natural light entering the second optical path channel 12 can be reflected by the reflective switching plate 132 to the first optical path channel 11. Preferably, a limiting step is provided on the inner wall of the side of the first optical path channel 11 distal to the second optical path channel 12 to hold the reflective switching plate 132 in the second position.

Figure 7:
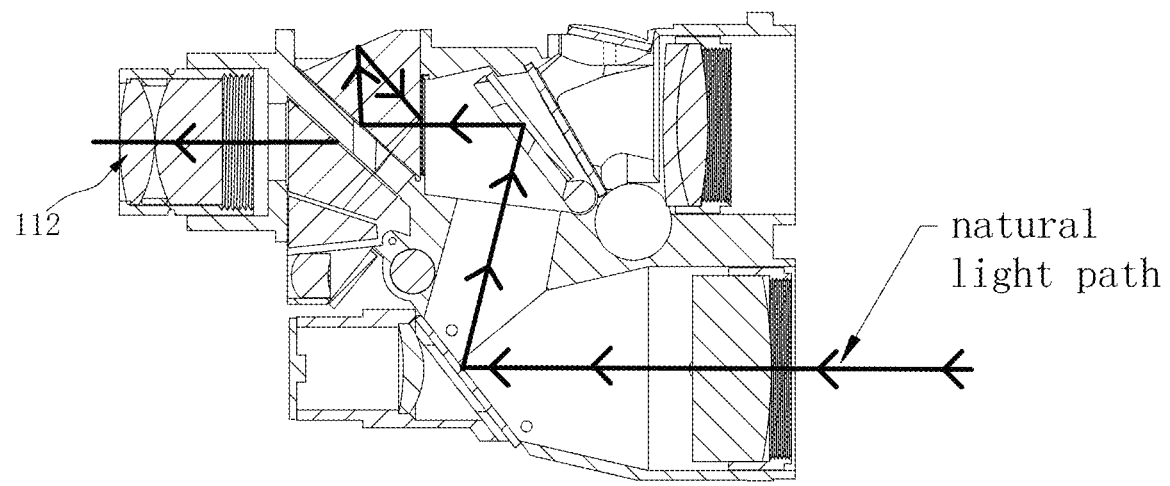
FIG. 7 is a cross-sectional view of the laser-ranging telescope with switchable magnification of FIG. 5 taken along line A-A, wherein the reflective switching plate is located at the second position, and the natural light path passing through the second optical path channel and the first optical path channel sequentially in shown.
Figure 8:
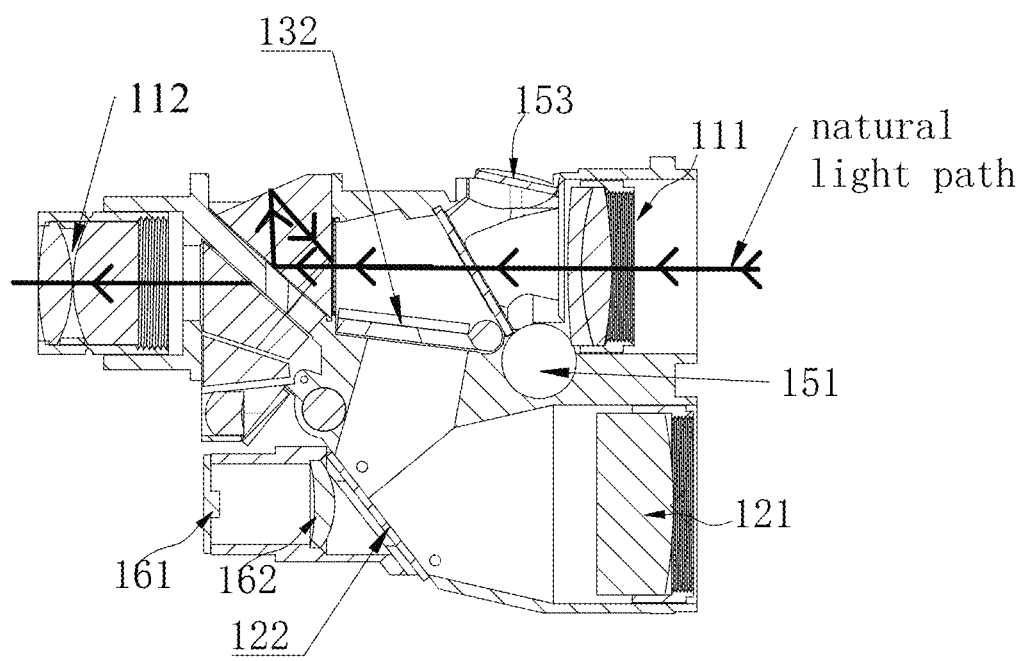
FIG. 8 is another cross-sectional view of the laser-ranging telescope with switchable magnification of FIG. 5 taken along line A-A, wherein the reflective switching plate is located at the first position, and the natural light path passing through the first optical path channel is shown.

As shown in FIGS. 6 and 8, when the reflective switching plate 132 is positioned in the first position, natural light emitted from the target object enters the first optical path channel 11 after passing through the first objective lens group 111, which transmits through the first dichroic mirror 115, is reflected by the prism group 114, and is imaged at the eyepiece group. At this point, the observer sees an image magnified by the first objective lens set 111, the prism set 114, and the eyepiece lens set 112. As shown in FIGS. 6 and 7, when the reflective switching plate 132 is positioned in the second position, natural light emitted by the target object enters the second optical path channel 12 after passing through the second objective lens set 121, and is reflected by the reflective switching plate 132 into the first optical path channel 11, and then reflected to the eyepiece set by the prism set 114 to image. At this point, the observer sees an image magnified by the second objective lens set 121, the prism set 114, and the eyepiece set 112. In this embodiment, the through-hole is provided between the first optical path channel 11 and the second optical path channel 12, and a deflectable reflective switching plate 132 is installed at the through-hole to change the optical path channel through which the natural light passes, thereby switching the magnification of the telescope without affecting the transmission of the laser.

Figure 9:
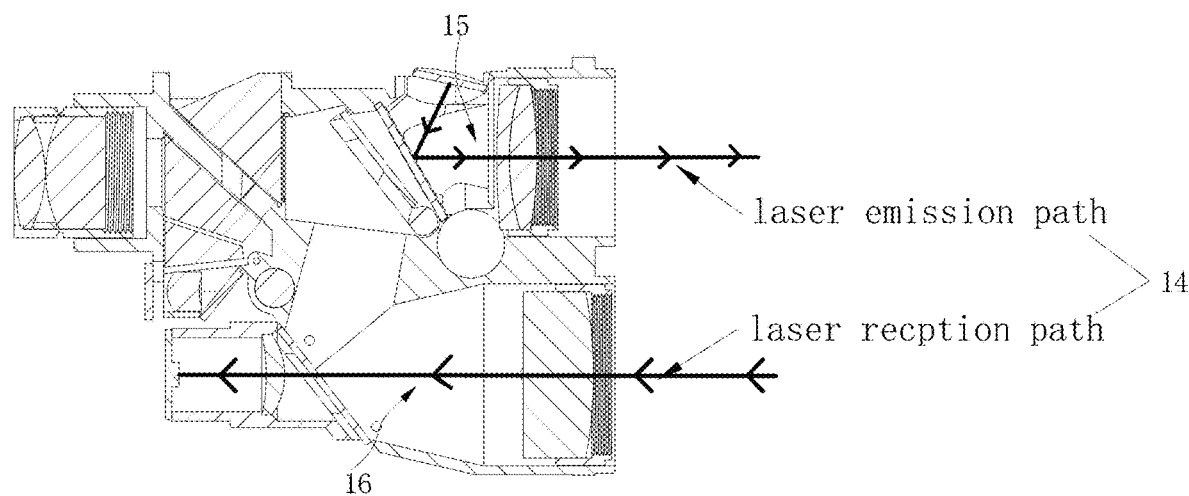
FIG. 9 is a cross-sectional view of the laser-ranging telescope with switchable magnification of FIG. 5 taken along line A-A, wherein the reflective switching plate is located at the first position, and another part of the laser emission path and the laser reception path is shown.

As shown in FIG. 9, the laser channel 14 includes a laser emission channel 15 and a laser reception channel 16, wherein the laser emission channel 15 at least partially coincides with the first optical path channel 11, and the laser reception channel 16 at least partially coincides with the second optical path channel 12.

Specifically, in this embodiment, the first optical path channel 11 is equipped with a laser emitter 151 for emitting laser. The first optical path channel 11 is further equipped with a first dichroic mirror 115 configured to reflect the laser and transmit the natural light. The laser emitted by the laser emitter 151 is reflected by the first dichroic mirror 115 to pass through the first optical path channel 11 and reach the target object. The reflector 122 in the second optical path channel 12 is a second dichroic mirror configured to reflect the natural light and transmit the laser. The second axial end of the second optical path channel 12 is further equipped with a laser receiver 161 for receiving laser. Preferably, the emission end of the laser emitter 151 and the reception end of the laser receiver 161 are respectively equipped with a first coupling mirror 154 and a second coupling mirror 162 for converging and collimating the laser.

Figure 4:
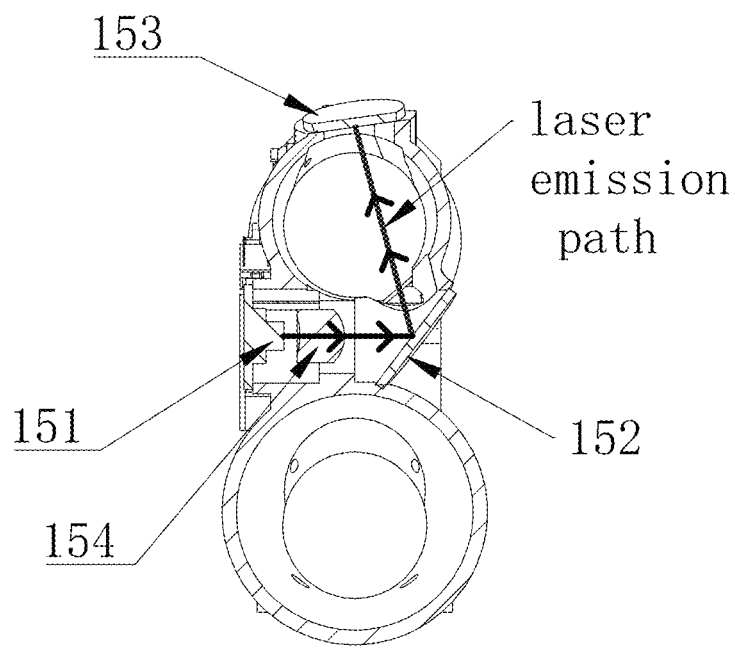
FIG. 4 is a cross-sectional view of the laser-ranging telescope with switchable magnification of FIG. 1 taken along line B-B, showing a part of the laser emission path.
Figure 5:
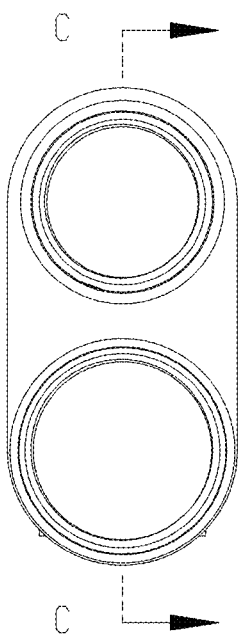
FIG. 5 is a top view of the laser-ranging telescope with switchable magnification shown in FIG. 1.

Please again refer to FIG. 6, the first dichroic mirror 115 is located between the first objective lens set 111 and the eyepiece lens set 112, and is tilted relative to the axial of the first optical path channel 11. As shown in FIG. 4, the opposing sides of the first dichroic mirror 115 are respectively equipped with a first laser reflector 152 and a second laser reflector 153, and the positions of which do not interfere with the transmission of natural light entering the first optical path channel 11. The laser emitter 151 is located between the reflective switching plate 132 and the first objective lens set 111, with its emission end facing vertically downwards when in use, and the first reflector 152 is disposed vertically below it for reflecting the laser emitted by the laser emitter 151 to the second laser reflector 153. The second laser reflector 153 is deposed on the inner side of the first optical path channel 11 distal to the second optical path channel 12 for reflecting the laser reflected by the first laser reflector 152 to the first dichroic mirror 115.

The laser emitter 151 emits a laser perpendicular to the axis of the laser-ranging telescope 100, which is sequentially reflected by the first laser reflector 152 and the second laser reflector 153 (see FIG. 4), then reflected by the first dichroic mirror 115, and then passes through the first optical path channel 11 and reaches the target object, forming a laser emission path (see FIG. 9). The laser reflected by the target object enters the second optical path channel 12, is transmitted by the second dichroic mirror, and received by the laser receiver 161 behind it, forming a laser reception optical path. It can be seen that the deflection of the reflective switching plate 132 does not affect the transmission of the laser. The principle of laser ranging could refer to existing technology and will not be elaborated here.

In this embodiment, the reflective switching plate 132 is positioned closer to the eyepiece set 122 relative to the first dichroic mirror 115, so that the deflection of the reflective switching plate 132 does not affect the transmission of laser in the first optical path channel 11. In addition, the inclination direction of the first dichroic mirror 115 is consistent with the inclination direction of the reflective switching plate 132 when located at the second position. In this way, the laser emitted by the laser emitter 151 is sequentially reflected by the first laser reflector 152, the second laser reflector 153, and the first dichroic mirror 115, and then passes through the first optical path channel 11 to reach the target object.

Preferably, the inclination of the reflective switching plate 132 is the same as that of the second dichroic mirror. In this way, natural light entering the second optical path channel 12 along the axial direction can continue to reach the prism set 114 along the axial direction after being reflected by the second dichroic mirror and the reflective switching plate 132.

A data display module 17 may further be installed inside the main body 10 to process the laser received by the laser receiver 161 into an image, which is then converged to the prism set 114 and displayed at the eyepiece set 112. In this way, when the user observes the target object with the telescope according to the disclosure, the image of the target object and its distance value from the telescope can be displayed simultaneously at the eyepiece set 122. Preferably, the laser receiver 161 is closer to the target object in the axial direction relative to the eyepiece set 112, thus, the axial length of the first optical path channel 11 is greater than that of the second optical path channel 12.

Figure 10:
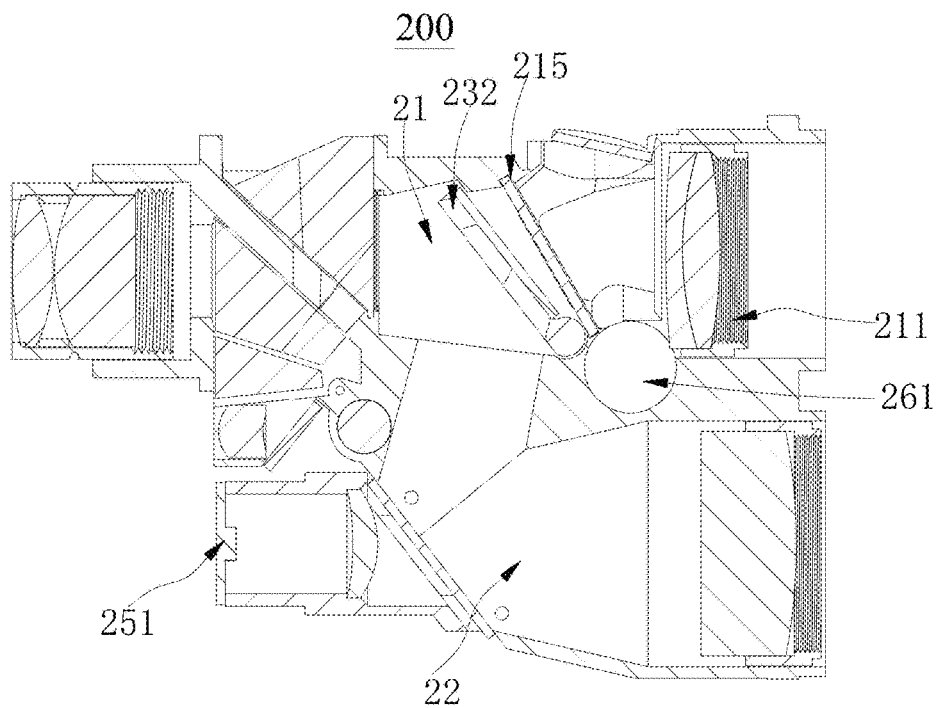
FIG. 10 is a cross-sectional view of a laser-ranging telescope with switchable magnification according to a second embodiment of the present disclosure.

FIG. 10 shows a laser-ranging telescope 200 of a second embodiment of the present disclosure, which is similar to the first embodiment, except for the laser ranging path. In this embodiment, the laser emission channel at least partially coincides with the second optical path channel, and the laser reception channel at least partially coincides with the first optical path channel. Specifically, the laser emitter 251 is located at the second axial end of the second optical path channel 22, and the laser receiver 261 is located within the first optical path channel 21 and between the first objective lens set 211 and the reflective switching plate 232. At this time, the natural light path of this embodiment is the same as that of the first embodiment, and the direction of the laser emission path is opposite to that of the laser reception path of the first embodiment, and the direction of the laser reception path is opposite to that of the laser emission path of the first embodiment.

Figure 11:
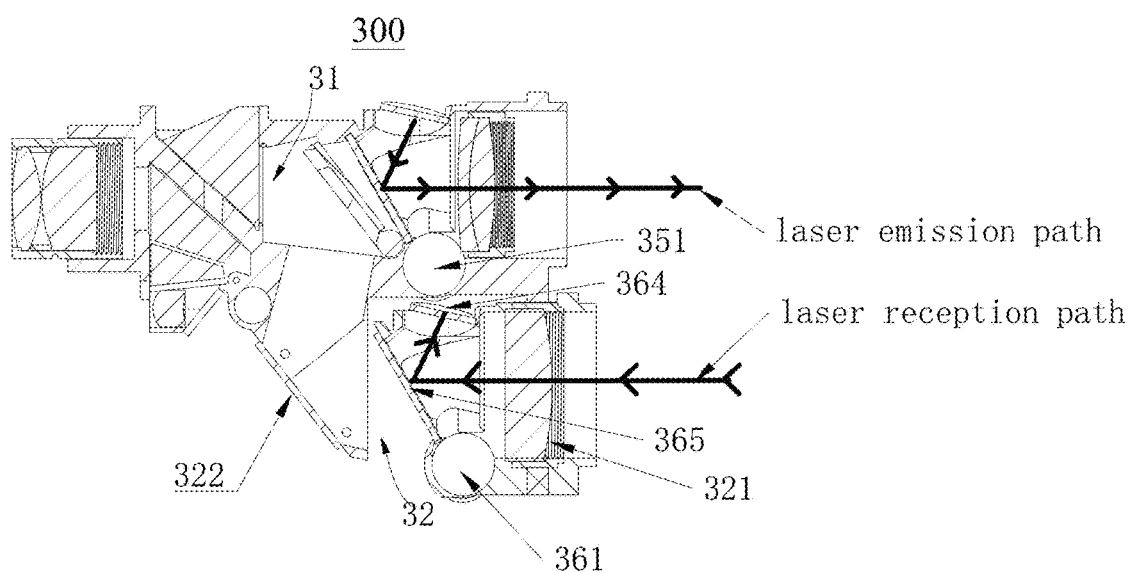
FIG. 11 is a cross-sectional view of a laser-ranging telescope with switchable magnification according to a third embodiment of the present disclosure, showing a part of the laser emission path and the laser reception path.
Figure 12:
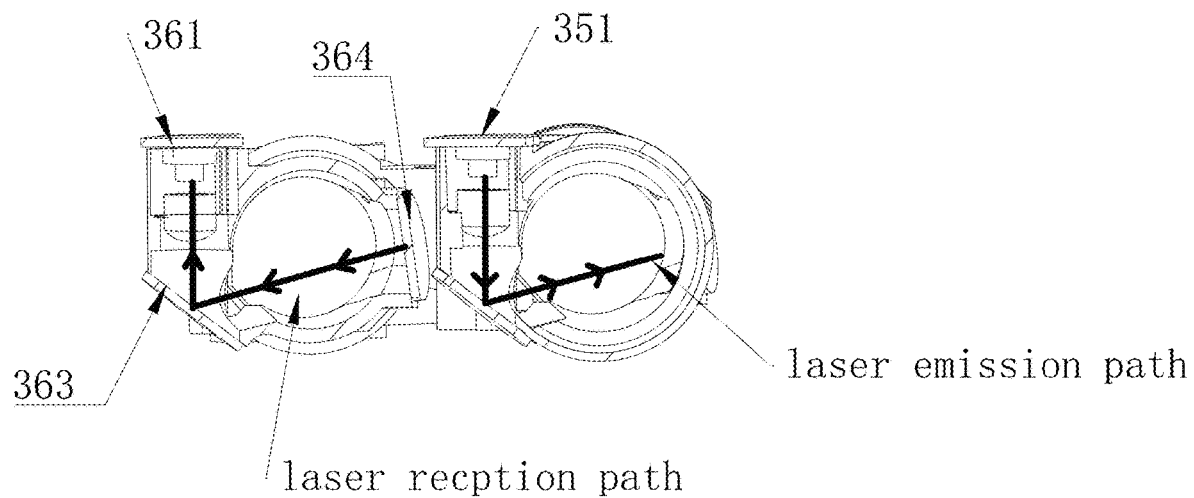
FIG. 12 is another cross-sectional view of the switchable magnification of FIG. 11, showing another part of the laser emission path and laser reception path.

FIGS. 11 and 12 show a laser-ranging telescope 300 according to a third embodiment of the present disclosure, which is similar to the first embodiment but differs in the laser reception path. In this embodiment, the laser emission channel at least partially coincides with the first optical path channel, and the laser reception channel at least partially coincides with the second optical path channel. Specifically, the laser receiver 361 is located within the second optical path channel 32 and close to the second objective lens set 321, with its position not interfering with the natural light entering the second optical path channel 32. In addition, the laser receiver 361 is located on the inner wall of the second optical path channel distal to the first optical path channel 31. A second reflector set, which includes a third laser reflector 363, a fourth laser reflector 364, and a second dichroic mirror 365, is provided within the second optical path channel 32. The third laser reflector 363 is located axially below the laser receiver 361, and the fourth laser reflector 364 is located on the inner wall of the second optical path channel 32 proximal to the first optical path channel 31. The second dichroic mirror 365 is tilted within the second optical path channel 32 and used to reflect laser and transmit natural light. The second reflector set is located between the first reflector 322 and the second objective lens set 321. In this embodiment, the laser emission path of the laser emitter 351 is the same as that of the first embodiment. The laser reflected by the target object enters the second optical path channel 32 and is then successively reflected by the second dichroic mirror 365, the fourth laser reflector 364 (see the laser reception path in FIG. 11), and is again reflected by the third laser reflector 363 before being received by the laser receiver 361 (see the laser reception path in FIG. 12). In this embodiment, since the laser does not need to pass through the first reflector 322, it is sufficient to select a reflector 322 that reflects natural light.

Figure 13:
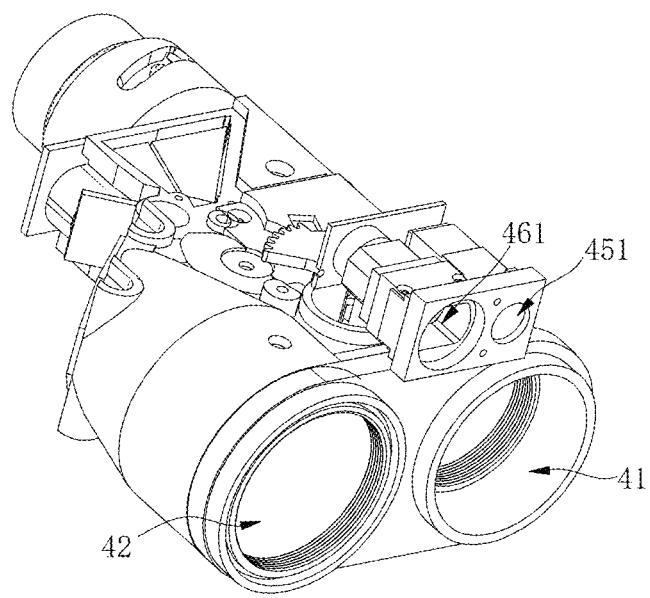
FIG. 13 is a schematic diagram of the structure of a laser-ranging telescope with switchable magnification according to a fourth embodiment of the present disclosure.

FIG. 13 shows a laser-ranging telescope 400 of a fourth embodiment of the present disclosure, the natural light paths thereof are similar to those of the first embodiment, except for the laser ranging optical path. As shown, the laser receiver 451 and the laser emitter 461 are deposed outside the first and second optical path channels 41, 42. That is to say, the laser emission path channel and laser reception path channel is independent of the first and second optical path channels 41, 42, wherein the term "independent" means that there is no coincidence.

Figure 14:
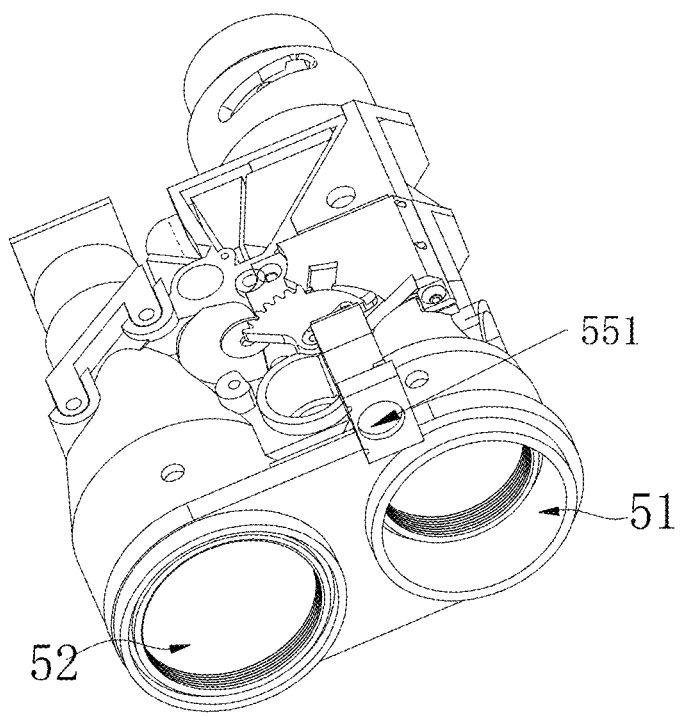
FIG. 14 is a schematic diagram of the structure of a laser-ranging telescope with switchable magnification according to the fifth embodiment of the present disclosure.

FIG. 14 shows a laser-ranging telescope 500 according to a fifth embodiment of the present disclosure, which is similar to the first or second embodiment except for the laser emission path, that is, the laser emission path channel is disposed independently to the first and second optical path channels 51, 52 and the laser reception channel. The laser emitter 551 is located outside the main body. At this time, the first or second optical path channel may also serve as the laser reception channel. The laser reception path of this embodiment is the same as that of the first embodiment, as shown in FIG. 9, or opposite in direction to the laser emission path of the second embodiment.

Figure 15:
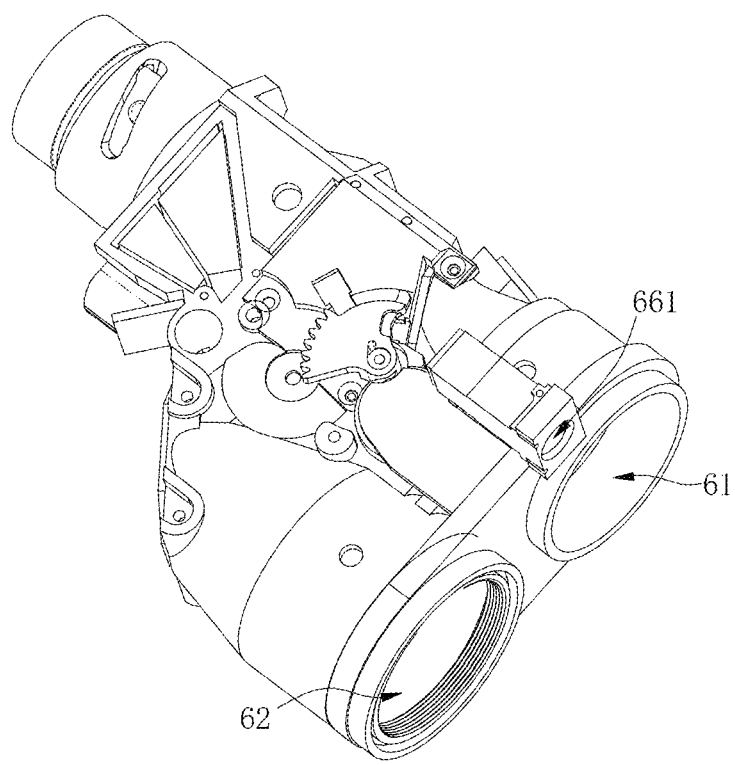
FIG. 15 is a schematic diagram of the structure of a laser-ranging telescope with switchable magnification according to the sixth embodiment of the present disclosure.

FIG. 15 shows a laser-ranging telescope 600 according to the sixth embodiment of the present disclosure, which is similar to the first or second embodiment, except for the laser reception path, that is set independently of the first optical path channel 61 and the second optical path channel 62, that is, the laser reception path channel is disposed independently to the first and second optical path channels and the laser emission channel. The laser receiver 661 is located outside the main body. At this time, the first optical path channel 61 or the second optical path channel 62 may also serve as the laser emission channel. The laser emission path of this embodiment is the same as that of the first embodiment, as shown in FIG. 9, or opposite to the direction of the laser reception path of the second embodiment.

The above is merely preferred embodiments of the present disclosure and is not intended to limit the scope of the present disclosure. The equivalent structures or equivalent processes made based on the disclosure concept of the present disclosure by the description and drawings of the present disclosure or the description and drawings of the present disclosure utilized directly or indirectly in other related fields of technology should be similarly included within the scope of the present disclosure.

What is claimed is:

1. A laser-ranging telescope with switchable magnification, comprising:
a main body provided with a laser channel, and a first optical path channel and a second optical path channel arranged in parallel along an axial direction, a through-hole being provided between the first optical path channel and the second optical path channel;
a first objective lens set arranged at a first axial end of the first optical path channel;
an eyepiece set arranged at a second axial end of the first optical path channel;
a second objective lens set arranged at a first axial end of the second optical path channel with magnification different from the first objective lens set;
a reflective switching plate arranged within the first optical path channel and deflectable between a first position and a second position; and
a first reflector tilted within the second optical path channel and configured to reflect natural light entering the second optical path channel to the reflective switching plate;
wherein when the reflective switching plate is positioned in the first position, the reflective switching plate closes the through-hole, and the natural light emitted by a target object passes through the first objective lens set and enters the first optical path channel to form an image at the eyepiece lens set; and
wherein when the reflective switching plate is positioned in the second position, the first optical path channel communicates the second optical path channel, and the natural light emitted by the target object passes through the second objective lens set and enters the second optical path channel, is reflected to the reflective switching plate by the first reflector, and is then reflected by the reflective switching plate to be imaged at the eyepiece set.

2. The laser-ranging telescope with switchable magnification according to claim 1, wherein the image magnification of the second objective lens set is greater than that of the first objective lens set, and an axial length of the first optical path channel is greater than that of the second optical path channel.

3. The laser-ranging telescope with switchable magnification according to claim 1, wherein the reflective switching plate has a free end, and a rotating wheel fixed and exposed to the main body for deflecting the reflective switching plate, wherein the rotating wheel is arranged closer to the first objective lens set relative to the free end.

4. The laser-ranging telescope with switchable magnification according to claim 3, wherein the rotating wheel is located near the through-hole, when the reflective switching plate is deflected to the first position, the free end rests on a side wall of the first optical path channel proximal to the second optical path channel, and when the reflective switching plate is deflected to the second position, the free end rests on a side wall of the first optical path channel distal to the second optical path channel.

5. The laser-ranging telescope with switchable magnification according to claim 1, wherein when the reflective switching plate is deflected to the second position, an inclination of the reflective switching plate relative to the axial direction is the same as that of the first reflector.

6. The laser-ranging telescope with switchable magnification according to claim 1, wherein the laser channel comprises a laser emission channel and a laser reception channel, wherein the laser emission channel at least partially coincides with the first optical path channel, and the laser reception channel at least partially coincides with the second optical path channel.

7. The laser-ranging telescope with switchable magnification according to claim 1, wherein the laser channel comprises a laser emission channel and a laser reception channel, wherein the laser emission channel at least partially coincides with the second optical path channel, and the laser reception channel at least partially coincides with the first optical path channel.

8. The laser-ranging telescope with switchable magnification according to claim 1, wherein the laser channel comprises independently disposed laser emission and reception channels.

9. The laser-ranging telescope with switchable magnification according to claim 1, wherein the laser channel comprises a laser reception channel and an independently disposed laser emission channel, wherein the laser reception channel at least partially coincides with the first optical path channel or the second optical path channel.

10. The laser-ranging telescope with switchable magnification according to claim 1, wherein the laser channel comprises a laser emission channel and an independently disposed laser reception channel, wherein the laser emission channel at least partially coincides with the first optical path channel or the second optical path channel.

11. The laser-ranging telescope with switchable magnification according to claim 6, wherein a side wall of the first optical path channel distal to the second optical path channel is equipped with a laser emitter, which is located between the first objective lens set and the reflective switching plate for emitting the laser; and a second axial end of the second optical path channel is equipped with a laser receiver for receiving the laser.

12. The laser-ranging telescope with switchable magnification according to claim 11, wherein an emission end of the laser emitter is equipped with a first laser coupling mirror for converging the laser; and a reception end of the laser receiver is equipped with a second coupling mirror for converging the laser.

13. The laser-ranging telescope with switchable magnification according to claim 12, wherein the first optical path channel is equipped with a first dichroic mirror that transmits the natural light, the laser emitted by the laser emitter is reflected by the first dichroic mirror, passes through the first optical channel, and then reaches the target object; wherein the first reflector is a second dichroic mirror that transmits the laser, and the laser reflected by the target object enters the second optical channel, is transmitted by the second dichroic mirror, and then received by the laser receiver.

14. The laser-ranging telescope with switchable magnification according to claim 13, wherein the reflective switching plate is deposed closer to the eyepiece set relative to the first dichroic mirror.

15. The laser-ranging telescope with switchable magnification according to claim 13, wherein when the reflective switching is positioned in the second position, it is tilted in a same direction as the first dichroic mirror.

16. The laser-ranging telescope with switchable magnification according to claim 7, wherein a second axial end of the second optical path channel is equipped with a laser emitter for emitting the laser; and a laser receiver is provided on a side wall of the first optical path channel, and the laser receiver is located between the first objective lens set and the reflective switching plate for receiving laser.

17. The laser-ranging telescope with switchable magnification according to claim 16, wherein an emission end of the laser emitter is equipped with a first coupling mirror for converging the laser; and a reception end of the laser receiver is equipped with a second coupling mirror for converging the laser.

18. The laser-ranging telescope with switchable magnification according to claim 16, wherein the first optical path channel is equipped with a first dichroic mirror that transmits the natural light, the laser reflected by the target object enters the first optical channel and is received by the laser receiver after being reflected by the first dichroic mirror; and the first reflector is a second dichroic mirror that transmits the laser, the laser emitted by the laser emitter is transmitted by the second dichroic mirror, passes through the second optical channel, and reaches the target object.

19. The laser-ranging telescope with switchable magnification according to claim 6, wherein the first optical path channel is equipped with a laser emitter for emitting the laser; the second optical path channel is equipped with a laser receiver for receiving the laser; and the first reflector is a natural light reflector.

20. The laser-ranging telescope with switchable magnification according to claim 19, wherein the second optical path channel is provided with a second reflector, which comprises a first laser reflector, a second laser reflector, and a dichroic mirror, wherein the second reflector is disposed between the second objective lens set and the first reflector for reflecting the laser entering the second optical path channel to the laser receiver.

* * * * *